United States Patent
Start

[11] Patent Number: 5,992,695
[45] Date of Patent: Nov. 30, 1999

[54] DISPENSING SYSTEM

[75] Inventor: Michael John Start, Guernsey, United Kingdom

[73] Assignee: Shurflo Pump Manufacturing. Co., Santa Ana, Calif.

[21] Appl. No.: 09/045,543

[22] Filed: Mar. 20, 1998

[51] Int. Cl.[6] .................................................. B67D 5/52
[52] U.S. Cl. .................. 222/137; 222/145.6; 222/145.7; 222/309; 222/388; 222/389
[58] Field of Search ................ 222/137, 145.5, 222/145.6, 145.7, 309, 334, 386, 388, 389

[56] References Cited

U.S. PATENT DOCUMENTS

| | | | |
|---|---|---|---|
| 3,825,155 | 7/1974 | Morault | 222/389 |
| 4,067,484 | 1/1978 | Standlick | 222/309 |
| 4,676,410 | 6/1987 | Von Flue | 222/137 |
| 5,022,556 | 6/1991 | Dency et al. | 222/309 |
| 5,088,631 | 2/1992 | Torterotot | 222/389 |
| 5,127,547 | 7/1992 | Gerich | 222/55 |
| 5,147,188 | 9/1992 | Shaefer | 417/511 |
| 5,285,932 | 2/1994 | Boudreau | 222/137 |
| 5,333,760 | 8/1994 | Simmen | 222/137 |
| 5,524,797 | 6/1996 | Schultz, Sr. | 222/334 |
| 5,542,574 | 8/1996 | Stern | 222/389 |
| 5,816,445 | 10/1998 | Gardos et al. | 222/334 |

FOREIGN PATENT DOCUMENTS

| | | |
|---|---|---|
| 2017815 | 10/1979 | United Kingdom . |
| 2285488 | 7/1995 | United Kingdom . |
| 2314592 | 1/1998 | United Kingdom . |
| 9014270 | 11/1990 | WIPO . |
| 9202414 | 2/1992 | WIPO . |

OTHER PUBLICATIONS

Powered Condiment Dispense, Catelog of Perfection Inn Dispense, 1996.
Chef on Draught, Catelog of Nestle Foods Service 1996.

*Primary Examiner*—Joseph A. Kaufman
*Attorney, Agent, or Firm*—Stout, Uxa, Buyan & Mullins; Frank J. Uxa

[57] ABSTRACT

A dispensing system has a gas-powered pump 5 supplied with gas through an inlet 16 from a supply 7 when an actuation valve 11 is operated, the actuation valve also causing the opening of a dispense valve 9 in the outlet 18 of the pump. Gas supplied to the inlet 16 displaces a drive piston 35 against the action of a return spring 41. A rod 31 movable by the drive piston 35 extends into a pumping cylinder 13 where it drives a two-part pumping piston 33 over a substance dispensing stroke. As the substance is being dispensed by the piston 33 a fresh charge of the substance is drawn into the cylinder through a substance inlet 27 connected to a supply 3, which may be a bag-in-box. During the return stroke, lost motion between an inner piston part 43 fixed to the rod 31 and an outer collar-shaped piston part 51 is adjustable by limit switches (109, FIG. 5B) or locking pins (99, FIG. 5A). The actuation valve may be push-button operated (FIGS. 4A and 4B).

37 Claims, 11 Drawing Sheets

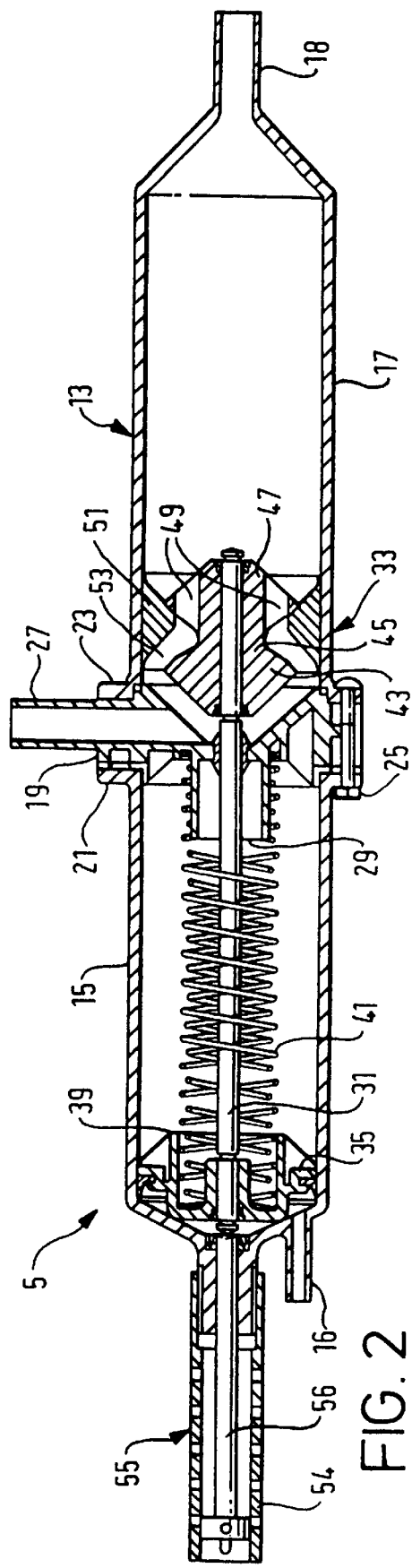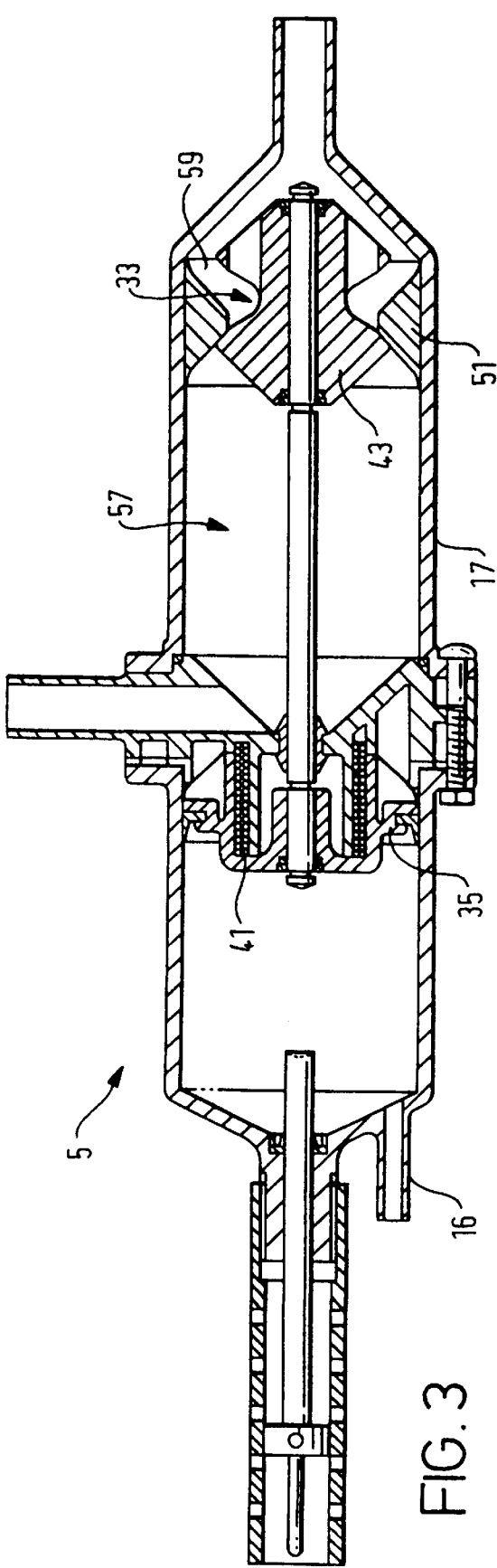

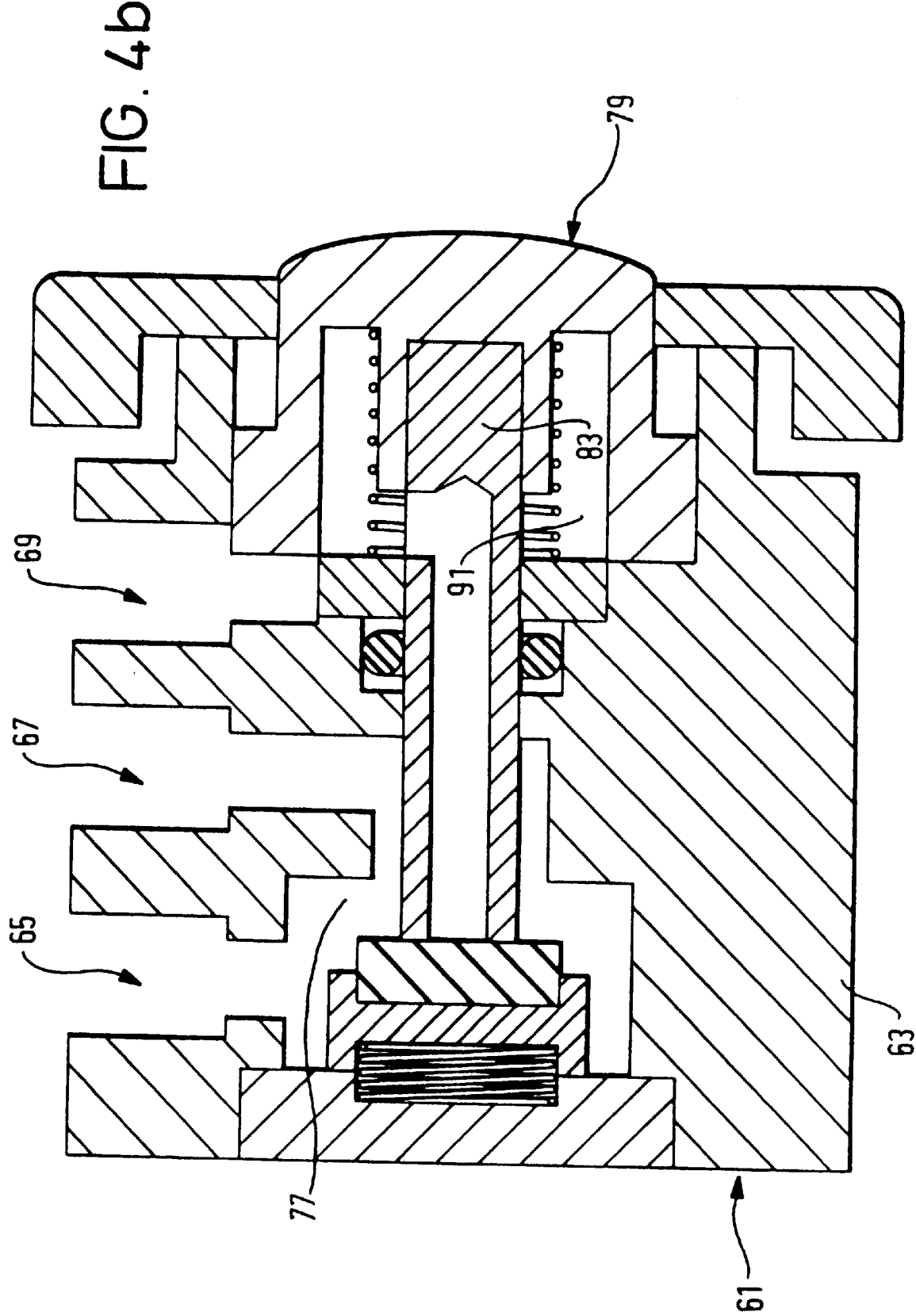

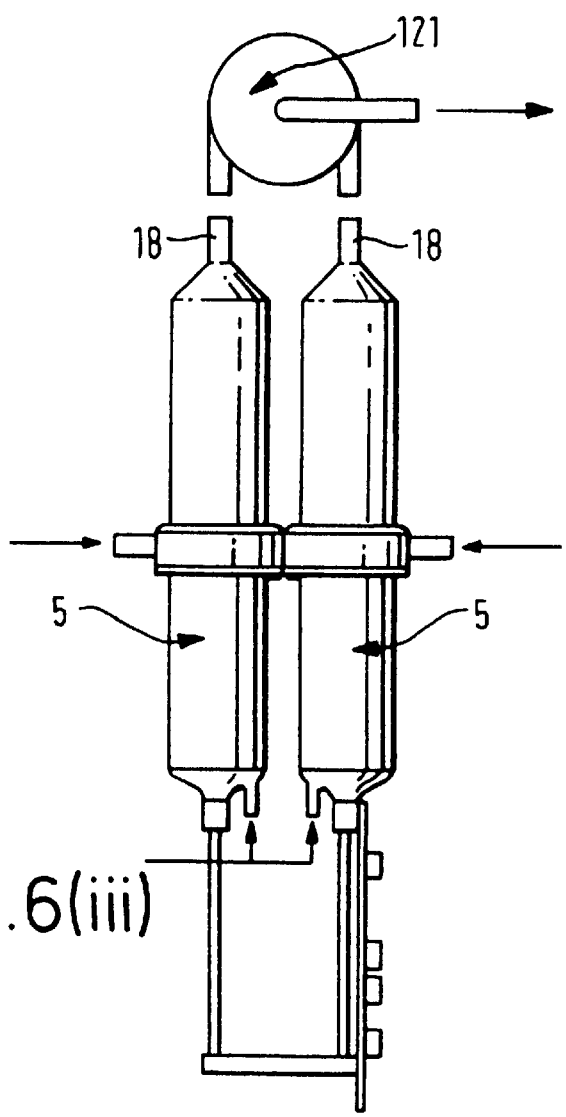
FIG. 6(iii)

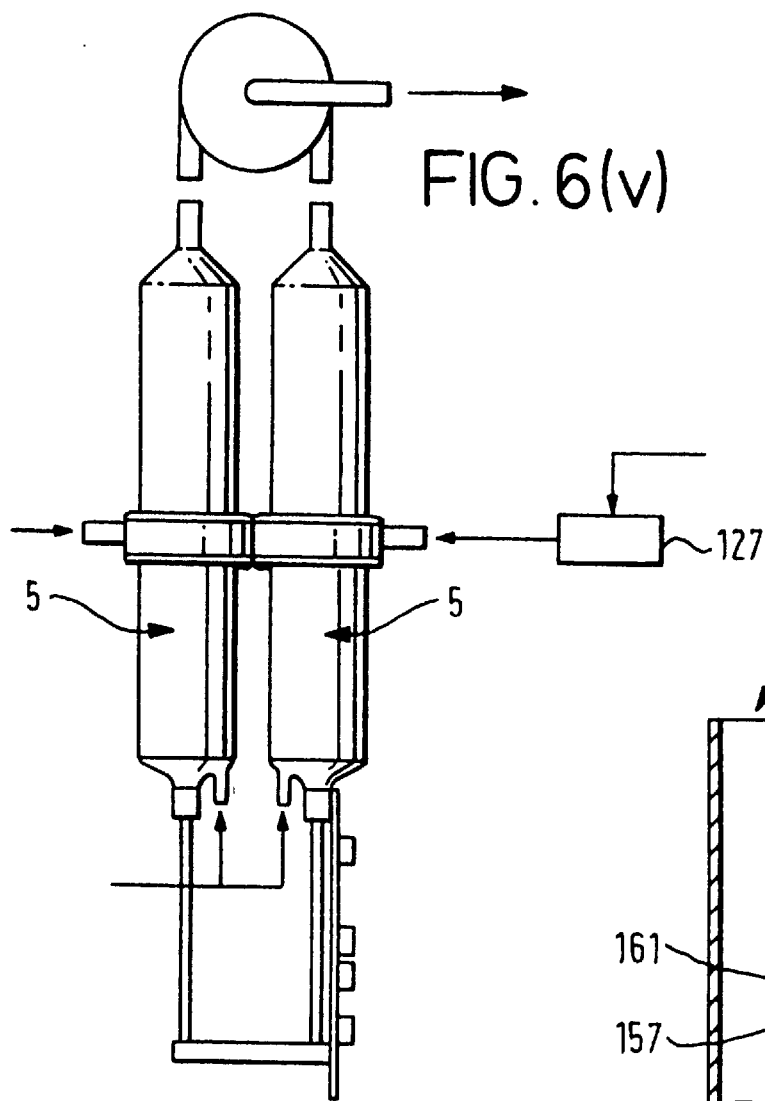
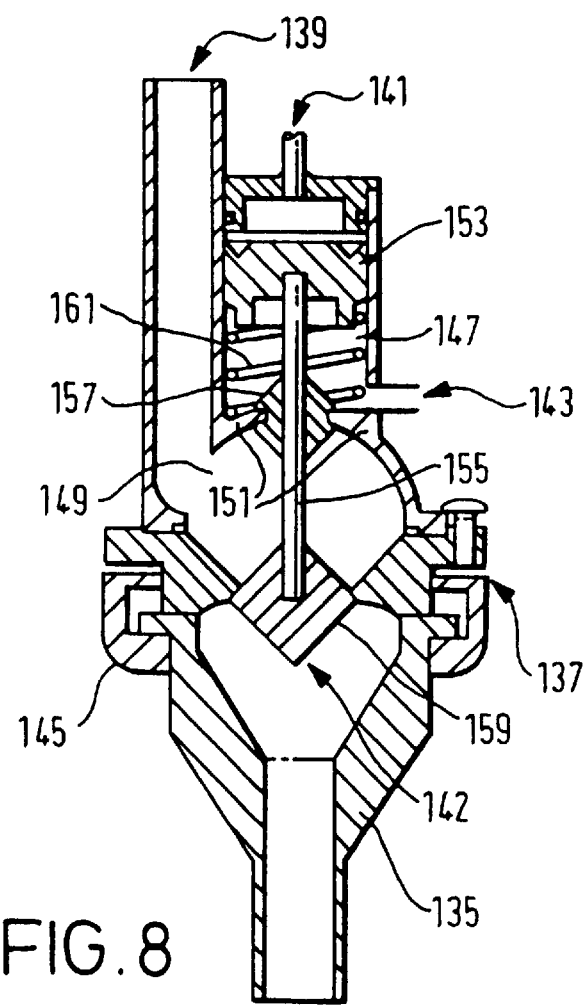

DISPENSING SYSTEM

FIELD OF THE INVENTION

The present invention relates to a substance dispensing system and, more particularly, to a system for dispensing condiments having an electronic control to vary the portion dispensed.

BACKGROUND OF THE INVENTION

Dispensing systems are commonly employed in a variety of different locations for dispensing a variety of different substances. For example, dispensing systems may be used in restaurants and kitchens for dispensing condiments of various kinds.

In prior systems, substances are often dispensed from "bag-in-box" containers by a diaphragm pump. In these systems, the substance to be dispensed is sealed within a deformable bag and drawn therefrom by a pump that is capable of generating a negative pressure to draw the substance from the container and a positive pressure to dispense the substance from the pump.

Whilst these diaphragm pumps are adequate for the task of dispensing substances, they suffer from a number of problems. The most notable of which is that the diaphragm pump is prone to damage caused by excessive negative or positive pressure. This excessive pressure can cause sudden movement of the diaphragm in the diaphragm pump which may cause the diaphragm to be damaged. Accordingly, the pressure employed in such a system must be carefully controlled.

These diaphragm pumps also suffer from problems with high viscosity substances and substances having particulates suspended therein. High viscosity substances can cause the diaphragm to be subjected to excessive pressure as described above. Substances with suspended particulates often cause the pump to become clogged.

In an effort to alleviate these problems, peristaltic pumps have been recently employed for dispensing systems. These peristaltic pumps, however, suffer from the problem that acidic or alkaline substances can cause a rapid degradation of flexible pipes and membranes in the pump. Furthermore, peristaltic pumps commonly generate insufficient pressure for dispensing of highly viscous substances. Peristaltic pumps are also difficult to clean and suffer from the above mentioned problem of clogging by particulates.

In addition to the above, any pump employed for the dispensation of condiments, for example, must also be hygienic and remain free from bacterial contamination.

SUMMARY OF THE INVENTION

In accordance with one aspect of the invention, there is provided a dispensing pump comprising: two coaxial cylinders each with a respective piston therein, the pistons being coupled together so that fluid power applied to the piston in one cylinder is effective to cause the other piston to draw substance to be dispensed into the other cylinder and to dispense it therefrom.

The fluid power may comprise a gas supply means comprising a gas bottle preferably controlled by at least one regulator.

In accordance with another aspect of the invention, a piston of a piston/cylinder dispensing system is formed by two components with a lost motion coupling therebetween which opens a passageway through the piston during a retraction stroke.

In accordance with another aspect of the invention, there is provided an actuation valve comprising a fluid inlet, a fluid outlet and a fluid exhaust, the valve having an operating member disposed therein, the operating member being moveable from a first location wherein the fluid outlet is in communication with the fluid exhaust to a second location wherein the fluid inlet is in communication with the fluid outlet.

The operating member may comprise a spring mounted stopper and a spring mounted button, the button comprising a cap with a hollow apertured plunger depending from said cap;

wherein, in the first location the spring mounted stopper abuts and closes an aperture in an internal wall of the actuation valve and fluid flow from the fluid outlet to the fluid inlet is prevented whilst fluid flow from the outlet to the exhaust is permitted; and wherein, in the second location the plunger bears upon the spring mounted stopper such that the spring mounted stopper is urged out of abutment with the aperture thereby to open the aperture, and fluid flow from said inlet to said outlet is permitted whereas fluid flow from said outlet to said exhaust is prevented.

Fluid flow from the outlet to the exhaust may be accomplished by way of a flow path comprising the outlet, the hollow apertured plunger and the exhaust.

In accordance with another aspect of the invention, there is provided a dispensing system comprising a pump means, an actuation valve, and a dispense valve, the actuation valve being in communication with the pump means and the dispense valve; such that upon actuation of the actuation valve, the dispense valve is opened and the pump means is powered to dispense substance through the dispense valve; and such that when actuation of the actuation valve is ceased, pumping of substance through the pump means is ceased and the dispense valve is closed.

In accordance with another aspect of the invention, the dispense valve may comprise a first chamber and a second chamber, the first chamber being adjoined to the second chamber and having a piston provided therein, the piston being coupled to a stopper provided in abutment with an outlet aperture in a wall of the second chamber, such that fluid power applied to one side of the piston causes the stopper to move out of abutment with the outlet aperture thereby to open the valve.

Fluid power may also be applied to the other side of the piston to cause the stopper to move into abutment with the outlet aperture thereby to close the valve. The fluid power used to close the outlet aperture may result from the exhaust of fluid from either a pump means or an actuation valve.

Aspects of the invention will now be described, by way of example only, with reference to the accompanying drawings, in which:

BRIEF DESCRIPTION OF THE DRAWINGS

FIG. 2 is an elevation in cross-section of a pump at the end of a retraction stroke;

FIG. 3 is an elevation in cross-section of a pump at the end of a delivery stroke;

FIG. 4b is an elevation in cross-section of an actuation valve in an inlet position, the valve being utilisable with the system of FIG. 1;

FIG. 8 is an elevation in cross-section of a dispense valve.

DESCRIPTION OF THE PREFERRED EMBODIMENTS

Whilst aspects of the invention are described herein in relation to dispensing systems for the dispense of condiments, both with and without suspended particulates, in kitchens restaurants and the like, it will be immediately apparent to persons skilled in the art that the present invention may be employed in a variety of alternative locations and for the dispense of a variety of alternative substances. Accordingly, this description is not to be read as limiting the present invention to one particular use, usage location or to one particular substance.

Figure 1:
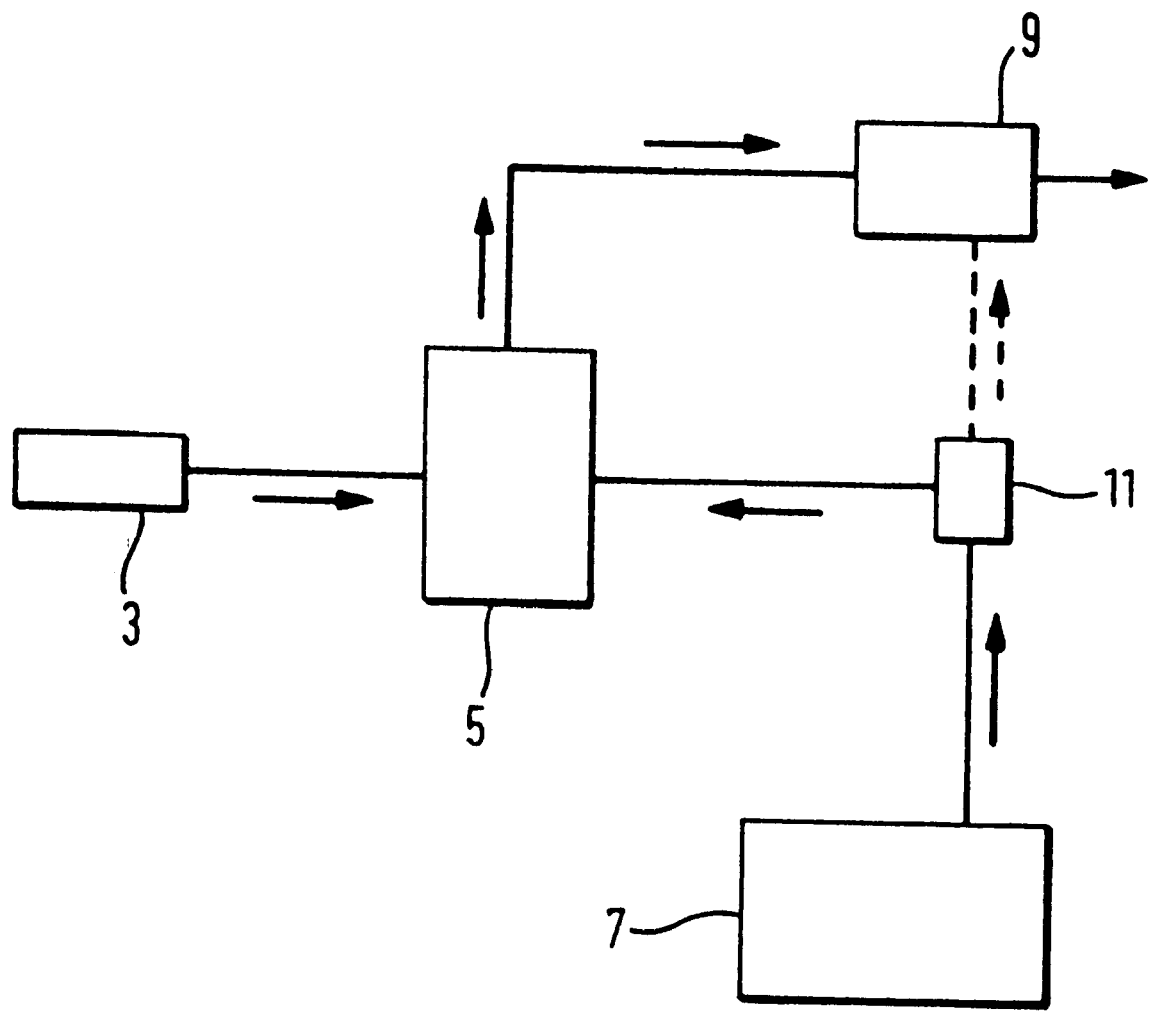
FIG. 1 is a schematic diagram of a dispensing system.

With reference to FIG. 1, one example of a dispensing system 1 is shown. The system 1 comprises bag-in-box substance storage means 3, pump means 5, gas supply means 7, at least one dispensing point 9 and actuation means 11. As will be described later in relation to FIGS. 5a and 5b, an optional connection may be provided between the actuation means 11 and the dispensing point 9.

A user operating the actuation means 11 causes gas to be supplied from the gas supply means 7 to the pump means 5. Supply of gas from the gas supply means 7 to the pump means 5 causes the pump means 5 to be actuated and to draw substance from the substance storage means 3. Simultaneously, substance is pumped from the pump means 5 to the dispensing point 9 where it is dispensed to the user. The gas supply means may comprise a gas bottle and one or more regulators (not shown) in order to provide gas of a given pressure to the pump means 5.

Advantageously, as mentioned above, the dispensing system 1 may be used to dispense viscous substances and substances having particulates suspended therein.

FIG. 2 illustrates an exemplary pump means 5 as shown in FIG. 1 at the end of a retraction stroke.

With reference to FIG. 2, the pump means 5 comprises an outer body 13 having a first part 15 and a second part 17, each comprising a substantially cylindrical hollow body open at a base end and tapering to a hollow nozzle at the other end. The base ends of the first part 15 and the second part 17 are provided with a flange 21 and a flange 23, respectively, the first part 15 and the second part 17 being coaxially disposed with their base flanges 21, 23 juxtaposed but with a third part 19 provided therebetween. In use, substance is dispensed through a nozzle 18 formed at said other end of the second part 17. A gas inlet 16 is provided substantially adjacent to the nozzle at said other end of the first part 15.

The third part 19 engages with the flange 21 on one side and with the flange 23 on the other side. Bolts 25 are provided to secure the flanges 21, 23 together and to the third part 19.

The third part 19 is provided with a substance inlet 27 which, in use, allows substance to be drawn from the substance supply means 3 into the second part 17 of the pump means 5. A substantially cylindrical member 29 extends from one side of the third part 19 through the open end of the first part 15 partway into the first part 15.

A piston rod 31 extends through the first part 15 and through a central aperture in the third part 19 into the second part 17. A wiping seal is provided within the central aperture to ensure that a substantially airtight seal is provided on the rod 31.

A substance piston 33 is fixed to one end of the rod 31 and a gas drive piston 35 is fixed to the other end thereof. The drive piston 35 is provided with a substantially cylindrical receptacle 39 open at one end on one side thereof. The drive piston 35 is sized so as to be slidable within the first part 15 and a seal is provided around the circumference of the piston 35 to ensure that a substantially airtight seal is provided between the piston 35 and the first part 15.

Gas supplied to the pump means 5 via the gas inlet 16 during use of the pump causes the piston 35 and piston rod 31 to move towards the base end of the first part 15.

Spring means 41 are provided about the rod 31 such that, when the pump is assembled, one end of the spring means 41 is received within the cylindrical receptacle 39 and the other end fits about the cylindrical member 29. The spring means preferably comprises two helical springs of opposite helix.

The substance piston 33 has a waisted first part comprising a head portion 43, a middle portion 45 and a base portion 47, the middle portion 45 having a smaller diameter than the head portion 43 and the base portion 47. Provided at intervals around the base portion 47 are a plurality of channels 49.

A second part of the substance piston 33 comprises a collar 51 in sliding abutment with an inner surface of the second part 17. The collar 51 has a substantially triangular cross-section that tapers towards its middle. An aperture in the collar 51 is sized so as to be of a smaller radius than the head and base portions of the first plunger 33, and of a larger radius than the middle portion 45. The first and second parts of the substance piston 33 are thus in lost motion coupling engagement with one another and a passageway 53 is intermittently provided between the first and second parts of the piston 33. As shown in FIG. 2, at the end of a retraction stroke, the passageway 53 is in communication with the channels 49 in the base portion 47 of the first plunger 33, and the collar 51 is in abutment with the base portion 47 of the first plunger 33.

As mentioned above, the arrangement depicted in FIG. 2 illustrates the pump means 5 at the end of a retraction stroke. The arrangement depicted in FIG. 3, which will now be described, illustrates the pump means 5 of FIG. 2 at the end of a delivery stroke. The gas piston 35 (and attached rod 31) has been driven towards the third part 19 by gas supplied to the pump means 5 via the gas inlet 16. Driving of the gas piston 35 has caused the spring means 41 received in abutment therewith to be compressed against the third part 19. Similarly, driving of the gas piston 35 has caused the substance piston 33 including the collar 51 to be driven towards the nozzle 18 with the head portion 43 in sealable abutment with the collar 51.

As the substance piston 33 including the collar 51 moved towards the nozzle 18, it caused a negative pressure to be generated in a region 57 of the second part 17 between the third part 19 and the substance piston 33. The negative pressure causes substance to be drawn through the substance inlet 27 and into the second part 17 behind the substance piston 33. Simultaneously, substance within the second part 17 forward of the substance piston 33 is dispensed via the nozzle 18.

When supply of gas to the gas inlet 16 is terminated, gas contained within the first part 15 can vent from the first part 15 via the gas inlet 16 and a vent (not shown). The venting gas causes a reduction in pressure within the first part which allows the gas piston 35 (and attached rod 31) to move towards the nozzle end of the first part 15 under the action of the spring means 41.

As the drive plunger 35 and attached rod 31 move towards the nozzle end of the first part 15, the substance piston 33 follows and opens the gap 53 between the head piston 43 and the collar 51 to provide a path through the substance piston 33.

The path, including the passageway 53 and the channels 49, serves to allow the substance piston 33 to be drawn back through the substance filling the second part 17 without causing substance to be expelled through the substance inlet 27. The fluid path can be large enough to allow quite large particulates suspended in the substance to pass therethrough without clogging.

Once the gas piston 35 has returned to the nozzle end of the first part 15, the pump means 5 is once more as shown in FIG. 2 and is ready for a further delivery stroke.

As shown in FIGS. 2 and 3, the pump may be provided with a portion control mechanism 55. In FIGS. 2 and 3, the mechanism 55 comprises an end stop 56 which extends a variable distance into the first part 15. The movement distance of the rod 31 is limited by the end stop 56 and thus the quantity of substance dispensed is similarly limited. The movement distance of the rod 31 may be varied by varying the position of a pin provided in an apertured collar through which the end stop 56 extends, the end of the end stop being in abutment with the pin at the end of a retraction stroke. Alternative mechanisms will be described later.

Figure 4A:
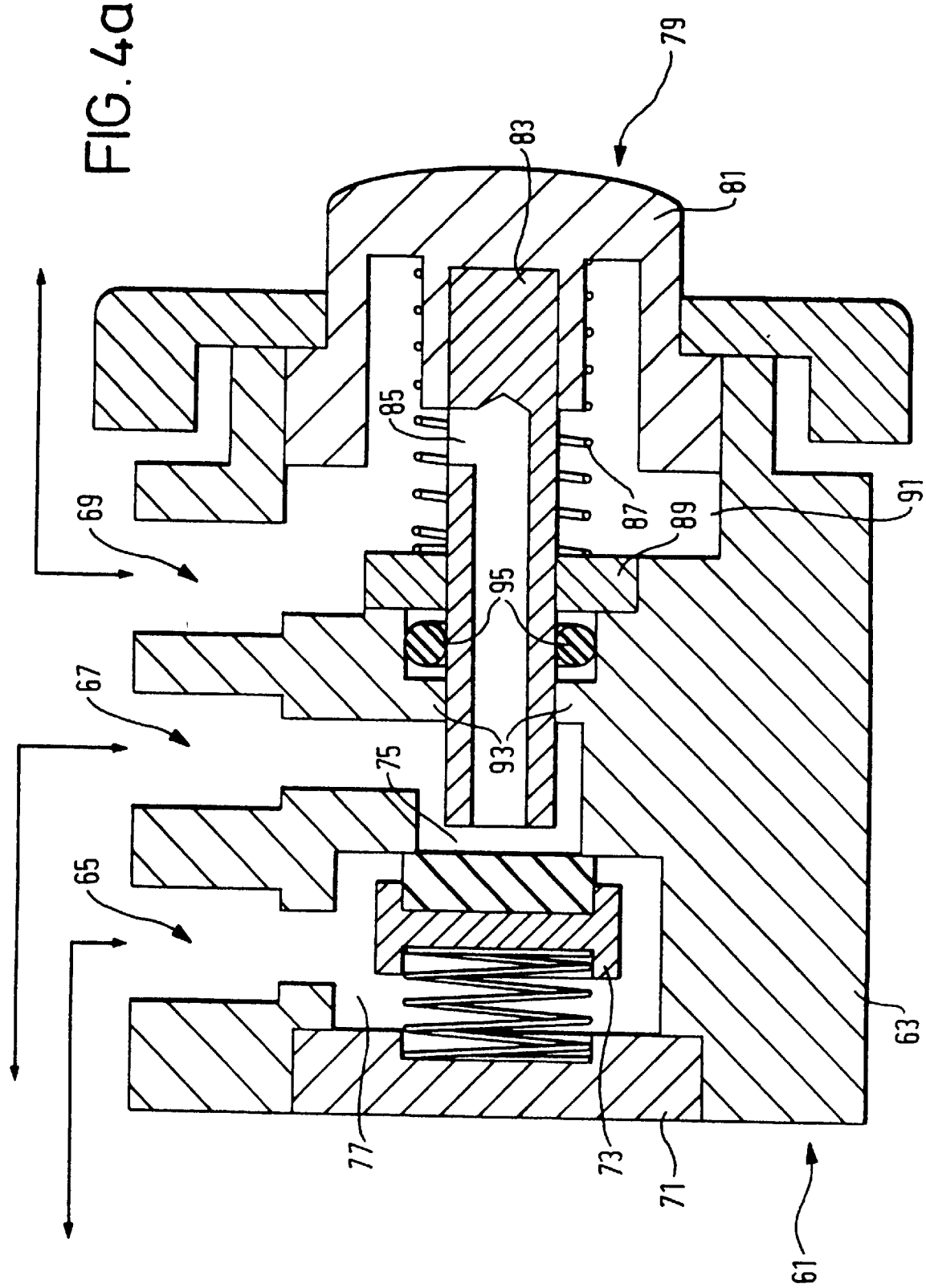
FIG. 4a is an elevation in cross-section of an actuation valve in an exhaust position, the valve being utilisable with the system of FIG. 1.

FIG. 4a is an elevation in cross-section of an actuation valve 61 in its exhaust position. The valve 61 comprises a hollow body 63 having an inlet 65, an outlet 67 and an exhaust 69. The valve may be used to control the supply of gas from the gas supply means (not shown) to the pump means 5, and to provide an exhaust for the vent of gas from the pump.

When assembled for use, the inlet 65 may be connected to the gas supply means 7 and the outlet 67 may be connected to the gas inlet 16 of the pump means 5. The exhaust 69 may either be left open, as shown, or may be connected to other pieces of equipment, such as a dispense valve, as will be later described.

Fixably located in one end of the hollow body 63 is a second body 71 having a spring mounted stopper 73 attached thereto. The spring mounted stopper 73 is movable to open and close a passageway 75 between the inlet 65 and the outlet 67.

A button 79 is provided at the other end of the hollow body 63. The button 79 comprises a cap portion 81 and a plunger portion 83 connected thereto. The plunger portion 83 comprises a hollow cylinder which is closed at the end connected to the cap portion 81. The plunger 83 is provided with an aperture 85 in a top portion thereof. Spring means 87 are provided about the plunger 83, the spring means 87 abutting, at one end, an underside of the cap portion 81 and, at the other end, a restraining member 89. The button and spring assembly are provided within a second cavity 91 of the hollow body 63, the second cavity 91 being separated from the first cavity 77 by an apertured internal wall 93. The plunger portion 83 of the button 79 extends from the second cavity 91 through the apertured internal wall 93 and into the first cavity 77. A seal 95 is provided about the plunger portion 83 and between the apertured internal wall 93 and the restraining member 89. The seal 95 provides a substantially airtight seal between the plunger portion 89 and the hollow body 63.

The hollow plunger portion 83 provides a passageway for gas flow between the outlet 67 and exhaust 69.

Depressing the button 79, as shown in FIG. 4b, causes the plunger 83 to bear upon the spring mounted stopper 73 thereby opening the passageway 75 between the inlet 65 and the outlet 67. Gas supplied to the inlet 65 may then flow to the pump connected to the outlet 67. The gas flowing from the outlet 67 to the pump means causes the pump means to be operated in the manner described above to dispense a substance (see FIG. 3).

Releasing the button 79, as shown in FIG. 4a, for example after a desired quantity of substance has been dispensed, causes the button 79 to return to the initial position shown in FIG. 4a under action of the spring means 87, and simultaneously causes the spring mounted stopper 73 to move to close the passageway 75. As the flow of gas to the pump is prevented, the pump ceases the dispense of substance.

At this point, the gas provided within the first part of the pump (which has been used to drive the drive plunger and cause the dispense of substance) is exhausted from the pump means by moving the drive piston. The exhausted gas exits the pump and flows into the actuation valve 61 via the outlet 67.

The actuation valve is now acting as a non-return valve as the spring mounted stopper 73, which is closing the passageway 75, prevents gas flow back into the gas supply means 7.

The gas returned to the actuation valve 61 from the pump means 5 enters the valve 61 via the outlet 67, flows through the open end of the plunger portion 83, exits the plunger portion 83 via the aperture 85 and exits the valve via the exhaust 69.

Figure 5A:
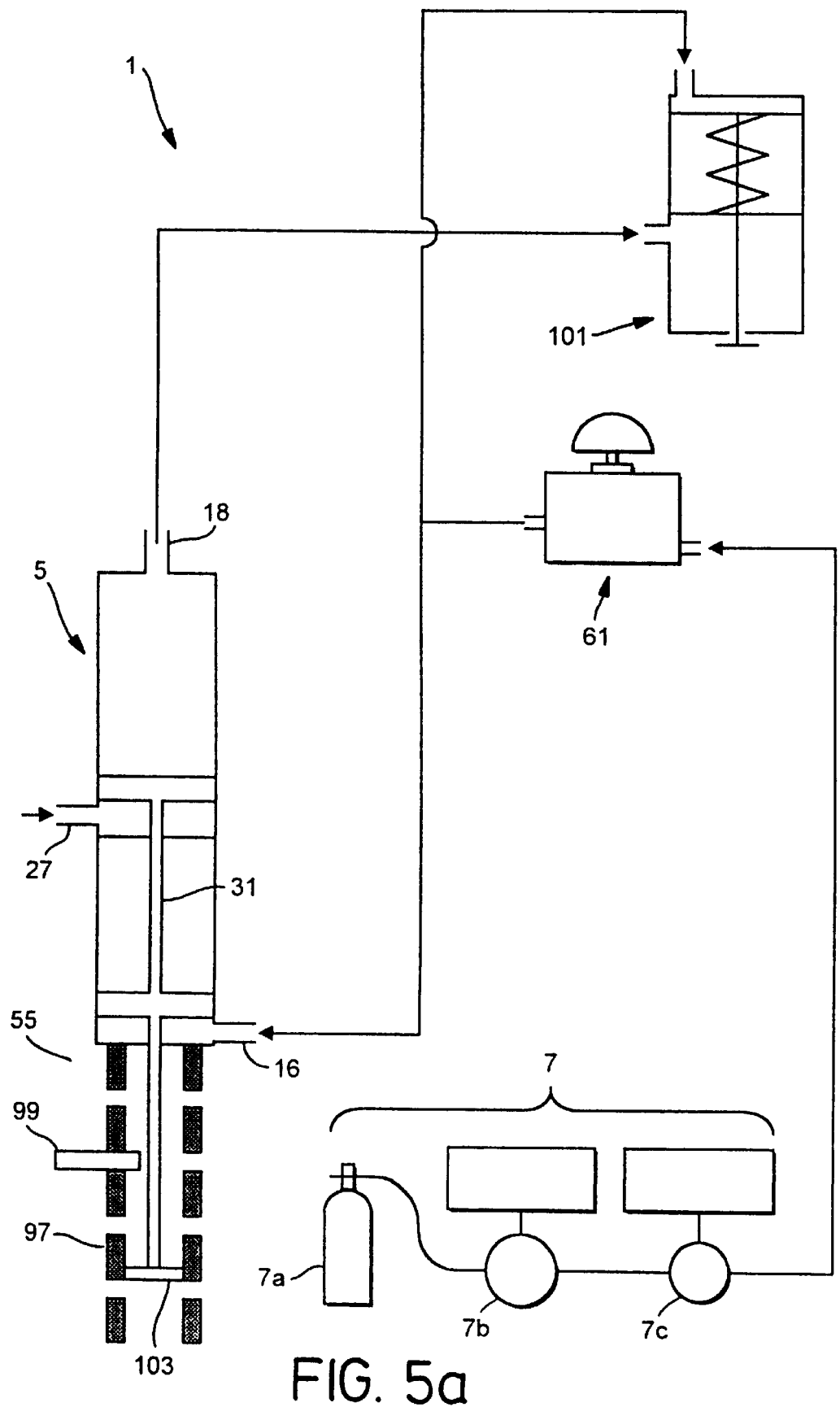
FIGS. 5a and 5b are further examples of dispensing systems.
Figure 5B:
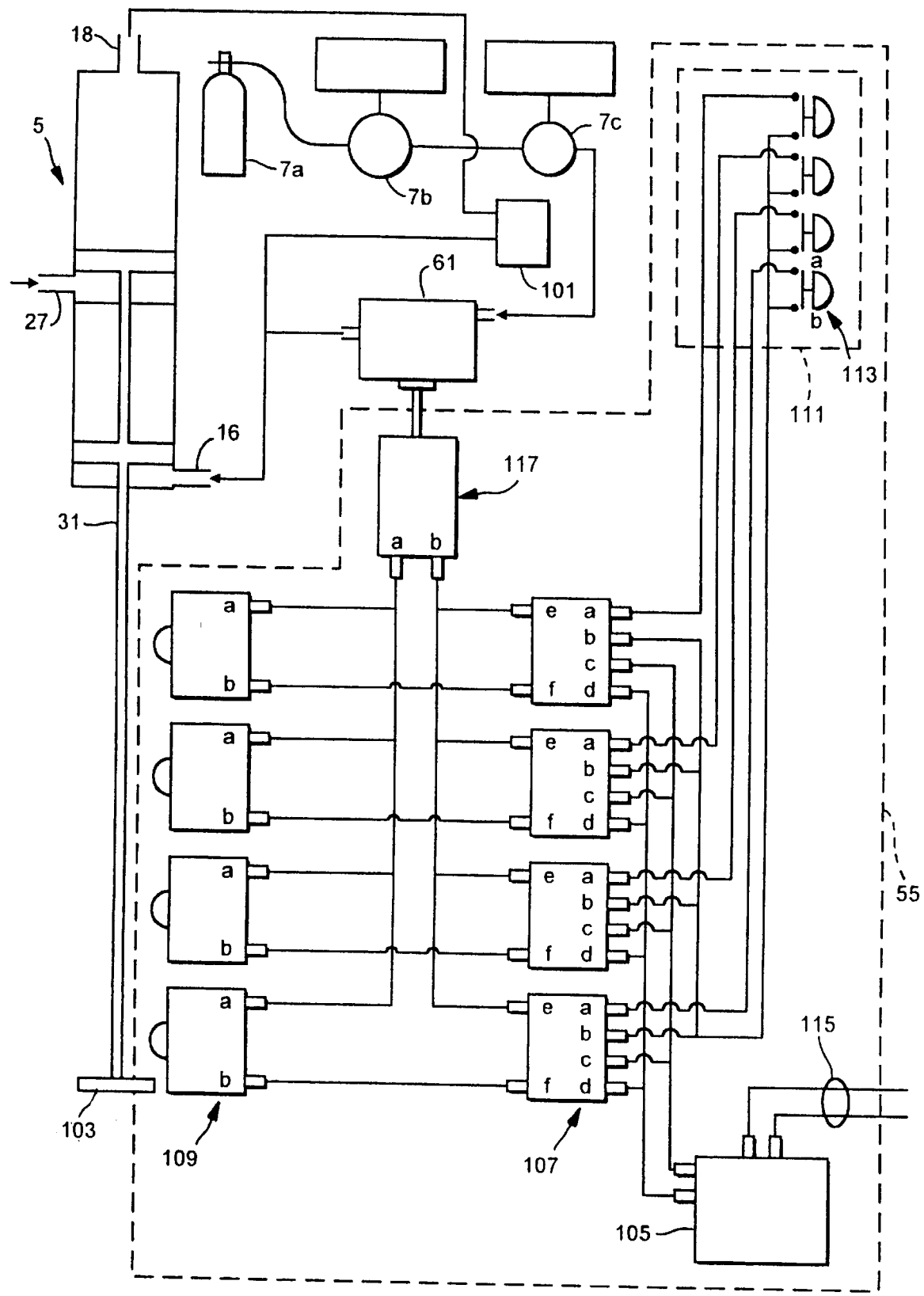

FIGS. 5a and 5b illustrate further examples of dispensing systems.

With reference to FIG. 5a, this example of a dispensing system 1 comprises gas supply means 7, pump means 5, an actuation means 61 and dispense valve means 101. The dispense valve means will be later described with reference to FIG. 8. This example of dispensing means incorporates another example of a portion control mechanism 55.

The gas supply means 7 supplies gas to the actuation means 61. The actuation means 61, when depressed, supplies gas to the gas input 16 of the pump means 5 thereby to operate the pump means 5, and supplies gas to the dispense valve 101.

The manual portion control mechanism 55 comprises a hollow cylinder 97 having a plurality of apertures therein. The cylinder 97 is, in this example, provided about an end of the rod 31. A transverse member 103 is affixed to the end of the rod 31 furthest from the nozzle 18 and is sized so as to be slidably receivable within the cylinder 97. A locking pin 99 is provided within one of the apertures in the cylinder 97, so that the transverse member 103 abuts the locking pin 99 thereby limiting the distance moved by the rod 31 and hence the portion size of substance dispensed.

The pin can either be provided so that it limits the movement of the substance piston, or it can be provided so that it limits the movement of the substance piston during the retraction stroke.

In use, substance is dispensed from the nozzle 18 to, in this example, a dispense valve 101 in response to actuation of the actuation means 61. The gas supplied to the dispense valve 101 holds the dispense valve 101 in an open position to allow substance to be dispensed therethrough. When actuation of the actuation means 61 ceases, the gas within the pump means 5 and the dispense valve 101 exhausts via the actuation means 61. As the gas exhausts, the dispense valve 101 closes thereby preventing unwanted dispense of substance and the pump means 5 returns to the start of the pump cycle (as described above in relation to FIGS. 2 and 3).

FIG. 5b illustrates a further example of a dispensing system. In particular, FIG. 5b illustrates an electronic portion control mechanism 55 operable to provide a multi-portion dispensing system.

Apart from the portion control mechanism 55, the other components of FIGS. 5a and 5b are identical and thus, only the portion control mechanism 55 and its operation will be described.

The portion control mechanism 55 enables, in this example, the dispense of four different portion sizes and comprises a transformer 105, four relays 107, four limit switches 109, a solenoid 117 and an operator's keypad 111 comprising four operating switches 113. The transformer 105 provides a means for transforming mains electricity, from supply 115, to a voltage suitable for use with the control mechanism 55. The solenoid 117 is operable to actuate the actuating means 61.

As shown, each relay 107 has six terminals "a" to "f", each limit switch 109 has two terminals "a" and "b" and each operating switch 113 also has two terminals "a" and "b". In this example, respective terminals "a" of each relay 107 are connected to respective terminals "a" of each operating switch 113. Respective terminals "b" of each relay are connected to a common line connecting respective terminals "b" of the operating switches 113. Terminals "c" and "d" of each relay 107 are connected to the transformed power supply. Respective terminals "c" of respective relays 107 are connected to a common line connected to a terminal "b" of the solenoid 117. Each terminal "f" of each relay 107 is connected to terminal "b" of the associated limit switch 109.

Each terminal "a" of each limit switch 109 is connected to a common line connected to a terminal "a" of the solenoid 117. Each terminal "b" of the limit switch 109 is connected to terminal "f" of its associated relay 107. In their initial position, the limit switches 109 are closed.

In use, depression of a switch 113 causes a circuit comprising a limit switch 109, the solenoid 117, a relay 107 and the depressed switch 113 to be energised by the transformed power supply. Energisation of this circuit causes the solenoid to actuate the actuation means 61 thereby to initiate operation of the dispensing system 1.

As the rod 31 of the pump means 5 begins to move, so the transverse member 103 is brought into contact with the various limit switches 109. When the transverse member contacts the limit switch 109 associated with the switch 113 that has been depressed, the limit switch is opened and the above mentioned circuit is broken. Accordingly, energisation of the solenoid 117 is ceased and the actuation means 61 returns to its initial position. Similarly, the dispense of substance ceases and the rod 31 returns to its initial position under action of the spring means (not shown) in the pump means 5.

The quantity of substance dispensed varies depending upon which switch 113 is depressed, as each switch is related to a different length of arm movement.

Advantageously, if an operator were to accidentally press two neighbouring switches, the system would actuate until the transverse member 103 had moved into contact with the switch corresponding to the greatest amount of substance dispensed (ie. the switch located closest to the nozzle 18). Contact between the transverse member and other limit switches would not cause actuation of the system to cease. This feature is enabled as each terminal "a" of each limit switch is connected to a common line that is in turn connected to a terminal "a" of the solenoid 117. If it were desired to remove this feature (ie. to ensure that an accidental depression of two neighbouring switches would result in the dispense of a quantity of substance corresponding to the limit switch furthest from the nozzle 18), each terminal "a" of each limit switch could be connected directly to the terminal "a" of the solenoid 117.

As described above, the limit switches 109 may comprise microswitches. Alternatively, the limit switches 109 may be reed switches (in which case the transverse member may be magnetised), optical switches or any other sort of mechanical or electronic switch.

Figure 6I:
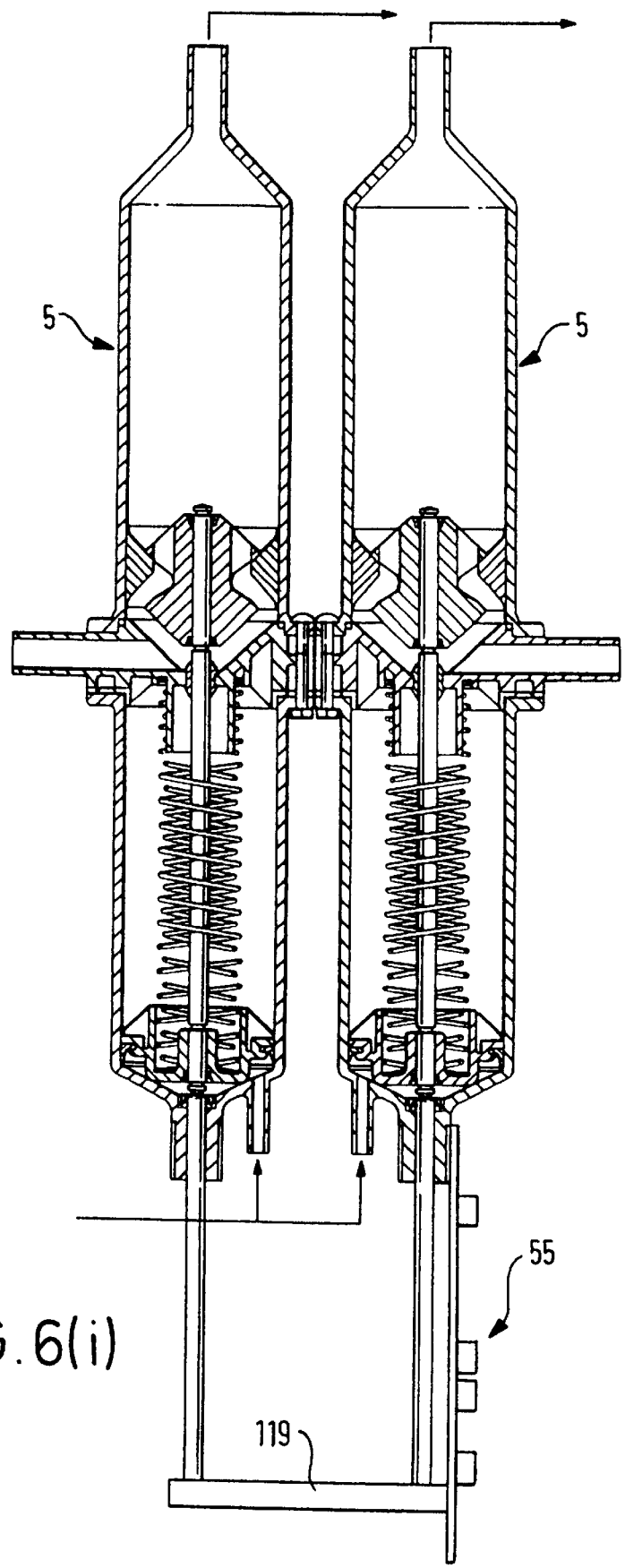
FIGS. 6(i) to 6(v) are exemplary arrangements of the pump shown in FIGS. 2 and 3.

FIGS. 6(i) to 6(v) are exemplary arrangements of the pump illustrated in FIGS. 2 and 3.

FIG. 6(i) illustrates a pair of pump means 5 as illustrated in FIGS. 2 and 3. In this example, the rods 31 of the respective pump means 5 have been joined together by a transverse member 119. One arm 31 is provided with a portion control mechanism 55 as shown in FIG. 5b. This system may be used for the simultaneous dispensation of two substances. In this system, the portion sizes are fixed for each pump means.

Figure 6:
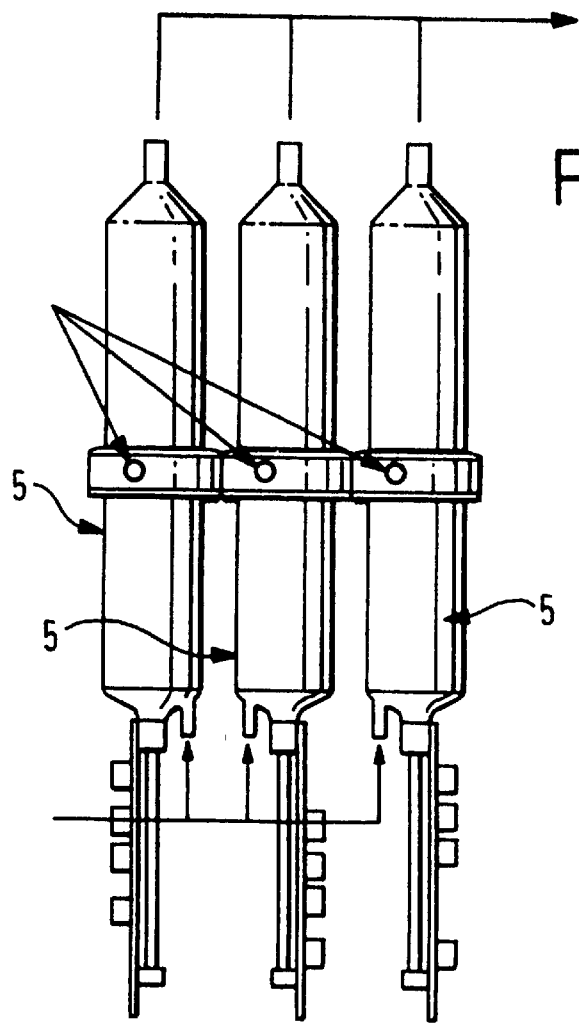
Figure 6:
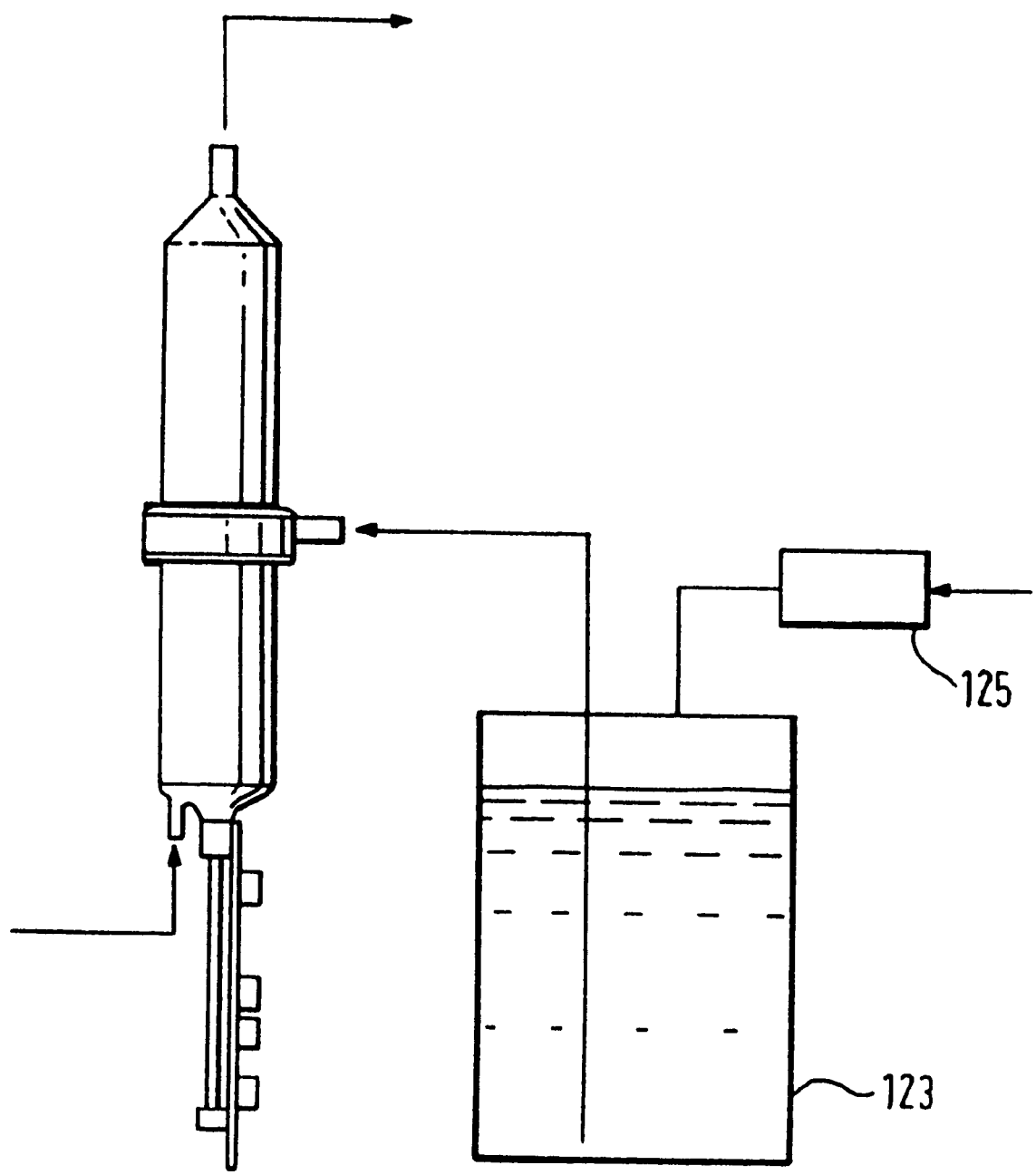

FIG. 6(ii) illustrates a system where three substances may be dispensed either simultaneously or individually. Each pump means 5 is provided with a portion control mechanism so that different sized portions may be selected for each substance to be dispensed.

FIG. 6(iii) illustrates a system identical to that illustrated in FIG. 6(i) except that a mixing chamber 121 is connected to the nozzles 18 of the pump means 5. The mixing chamber will be later described in relation to FIG. 7.

FIG. 6(iv) illustrates a dispensing system for use with non-"bag-in-box" storage media. These storage media typically comprise a sealed container that is not deformable. In this system, as substance is drawn from the container 123, so the substance drawn is replaced with gas via a breather valve 125.

FIG. 6(v) illustrates a dispensing system where a concentrated substance is mixed with water to form the desired substance and then dispensed. As shown, one pump means 5 dispenses concentrate, whilst the other dispenses potable water drawn from a supply via a demand valve 127. The dispensed water and concentrate are then mixed in a mixing chamber and subsequently dispensed.

Figure 7:
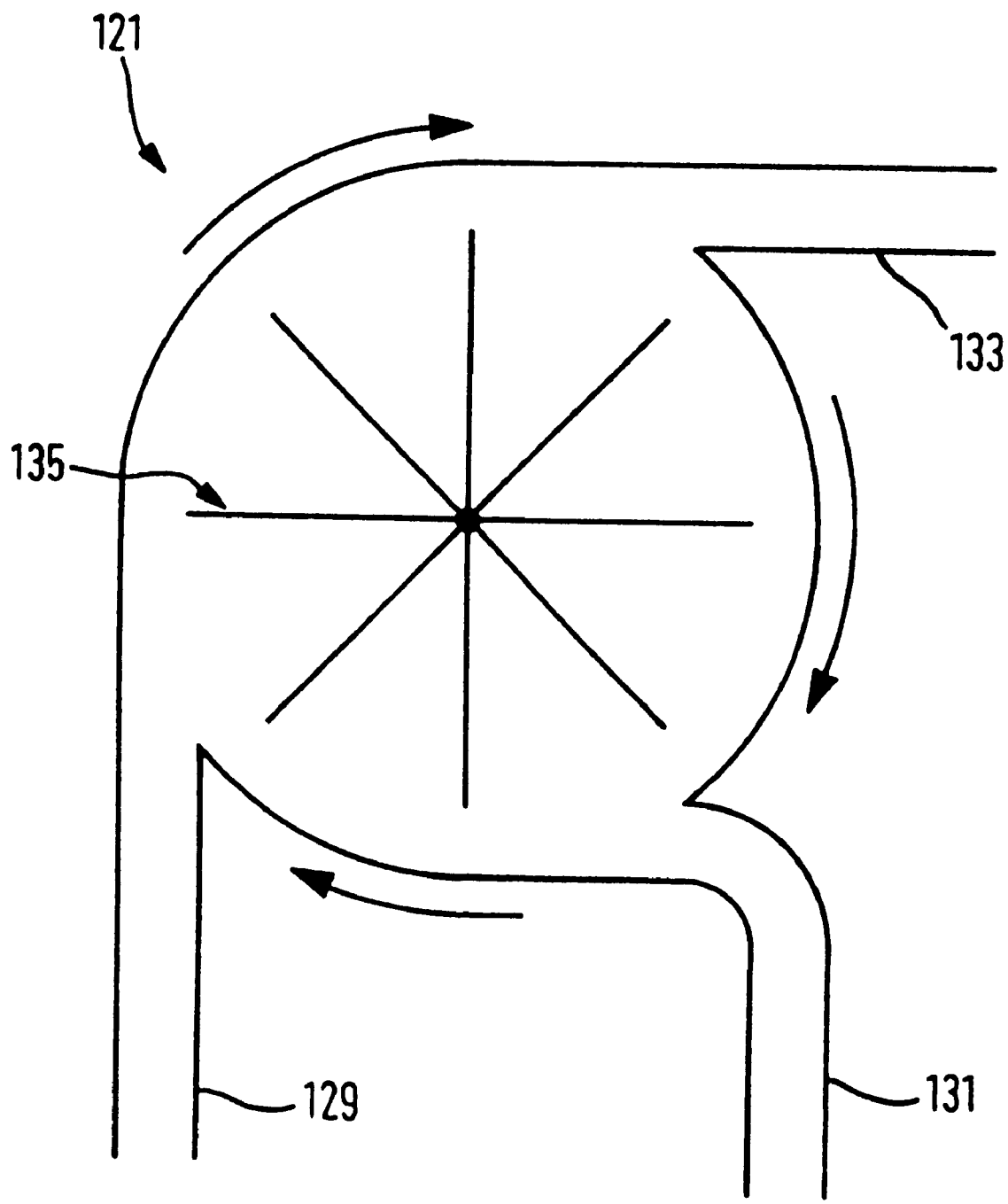
FIG. 7 is a cross-sectional plan view of a mixer head.

FIG. 7 illustrates a plan view in cross section of a mixing chamber 121 as mentioned above. The chamber 121 comprises a first inlet 129 and a second inlet 131 for the inlet of a first and second dispensed substance respectively. The substances are mixed by a rotatable spoked wheel 135 and subsequently dispensed from the outlet 133. It will be apparent that the mixing chamber, rather than being connected to respective nozzles of respective pump means, could be connected to the substance inlet 27 so that mixed substance passes into the pump means 5 for subsequent dispensation.

FIG. 8 illustrates an elevation in cross-section of a dispense valve 101 as shown in FIG. 5a.

With reference to FIG. 8, the dispense valve 101 comprises a hollow valve head 135 and a hollow valve body 137 having a first cavity 147 and a second cavity 149 provided therein. The first cavity 147 is connected to a gas supply inlet 141 and an exhaust gas inlet 143, and the second cavity 149 is connected to a substance inlet 139 and a substance outlet 142.

The hollow valve head 135 is releasably juxtaposed to the substance outlet 142 of the second cavity 149 by a bayonet fitting 145 so that the valve head may be easily removed for cleaning.

A gas drive piston 153 is provided within the first cavity 147. The piston 153 is connected to one end of a rod 155 that extends into the second cavity 149 via an aperture in a wall 151 separating the first and second cavities. A wiper seal 157 is provided between the rod 155 and the wall 151 so that a substantially gas-tight seal is provided on the rod 155. A stopper 159 is connected to the other end of the rod 155 such that the stopper 159 closes the substance aperture 142 when the piston 153 is closest to the gas inlet 141 (as shown).

Spring means 161 are provided in the first cavity 147 and about the rod 155 such that one end of the spring means 161 abuts the wall 151, whilst the other end abuts the piston 153.

When assembled for use in one example, the substance inlet may be connected to the nozzle of the pump means and the gas inlet 141 may be connected to the outlet of the actuation means. In another example, the exhaust inlet 143 may be connected to the exhaust of the actuation means.

Actuation of the actuation means causes gas to be supplied from the actuation means to the pump means and the dispense valve gas inlet 141, thereby causing the dispense valve drive piston 153 to move towards the wall 151 and compress the spring means 161. Movement of the piston 153 causes a corresponding movement of the rod 155 and attached stopper 159 such that the stopper 159 moves out of abutment with the substance outlet 142 thereby opening the valve.

Simultaneously, substance is dispensed from the nozzle of the pump to the substance inlet 139 of the dispense valve 101. The substance arriving at the substance inlet 139 flows through the second cavity 149 and exits the dispense valve 101 via the substance outlet 142 and the valve head 135.

When the supply of gas is ceased by release of the actuation means, the stopper 159 returns into abutment with the substance outlet 142 due to decompression of the spring means 161 and the dispense valve is closed.

In order to speed the closure of the substance outlet 142 by the stopper 159, the exhaust of the actuation means may be connected to the exhaust inlet 143 in the dispense valve 101. In this way, gas exhausted from the actuation valve serves to aid the spring means 161 in forcing the piston 153, rod 155 and attached stopper 159 to return to their initial positions.

It will be understood, of course, that aspects of the present invention have been described above by way of example only. Accordingly, modifications and additions may be made within, and without departing from, the scope of the present invention.

What is claimed is:

1. A dispensing system for dispensing substance comprising a pump assembly, an actuation valve, a dispense valve and an electronic control assembly, the actuation valve being in communication with the pump assembly and the dispense valve such that upon actuation of the actuation valve, the dispense valve is opened and the pump assembly is powered to dispense substance through the dispense valve, and such that when actuation of the actuation valve is ceased, pumping of substance through the pump assembly is ceased and the dispense valve is closed, the electronic control assembly being coupled to the actuation valve and being adapted to control the actuation of the actuation valve, wherein the actuation valve comprises a body with a fluid inlet, a fluid outlet, a fluid exhaust, and an operating member, the operating member being movable from a first location wherein the fluid outlet is in communication with the fluid exhaust to a second location wherein the fluid inlet is in communication with fluid outlet, and wherein the operating member includes a resiliently biased stopper and a resiliently biased button, the button having a cap with a plunger depending therefrom, the plunger having a hollow aperture;

wherein, in the first location, the stopper abuts and closes an aperture in an internal wall of the actuation valve and fluid flow from the fluid outlet to the fluid inlet is prevented while fluid flow from the outlet to the exhaust is permitted; and wherein, in the second location, the plunger bears upon the stopper such that the stopper is urged out of abutment with the aperture thereby to open the aperture, and fluid flow from the inlet to the outlet is permitted while fluid flow from the outlet to the exhaust is prevented.

2. A dispensing system according to claim 1, wherein the pump assembly comprises a power cylinder and a dispense cylinder coaxial to the power cylinder, each of the cylinders having a respective piston therein, the pistons being coupled together so that fluid power applied to the piston in the power cylinder is effective to cause the piston in the dispense cylinder to draw substance to be dispensed into the dispense cylinder and to dispense substance from the dispense cylinder.

3. A dispensing system according to claim 2, wherein the piston in the dispense cylinder is formed by two components with a lost motion coupling therebetween, the coupling opening a passageway through the piston in the dispense cylinder during a retraction stroke of the pump assembly.

4. A dispensing system according to claim 2, wherein the power cylinder includes a resilient biasing component for driving the piston in the power cylinder during a retraction stroke of the pump assembly.

5. A dispensing system according to claim 2, further comprising a sealing component provided between the piston in the power cylinder and the power cylinder wall.

6. A dispensing system according to claim 2, wherein the electronic control assembly is adapted for controlling the stroke length of the pump assembly.

7. A dispensing system according to claim 6, wherein the electronic control assembly comprises a longitudinal member connected to and movable with the piston in the power cylinder, the longitudinal member being reciprocally movable at least partly outside of the power cylinder.

8. A dispensing system according to claim 6, wherein the electronic control assembly includes an electric power source, a plurality of limit switches, a plurality of relays, a solenoid and a plurality of operating switches, each operating switch being connected to a respective relay and each relay being connected to a respective limit switch.

9. A dispensing system according to claim 8, wherein actuation of one of the operating switches causes the solenoid to be powered to open the actuation valve to cause the pump assembly to be powered until the limit switch connected to the actuated operating switch is opened at which point the power supply to the solenoid is interrupted and the actuation valve closes.

10. A dispensing system according to claim 1, wherein the dispense valve is connected to the actuation valve, such that fluid power supplied to the actuation valve for operating the pump assembly also causes the dispense valve to be opened.

11. A dispensing system according to claim 10, wherein the dispense valve comprises a first chamber and a second chamber, the first chamber being adjoined to the second chamber and having a piston provided therein, the piston being coupled to a stopper provided in abutment with an outlet aperture in a wall of the second chamber, such that fluid power applied to one side of the piston causes the stopper to move out of abutment with the outlet aperture thereby to open the dispense valve.

12. A dispensing system according to claim 1, further comprising at least one additional pump assembly mechanically linked to the pump assembly for joint operation with the pump assembly.

13. A dispensing system according to any of claim 12, further comprising a mixer head for mixing substance dispensed from any two or more of the pump assemblies.

14. A dispensing system according to claim 13, wherein the mixer head comprises a hollow body having an outlet and at least two inlets, the inlets being connectable to respective pump assemblies, and a vaned rotor provided within the hollow body, the rotor rotating to mix substance dispensed from each of the pump assemblies and to dispense the mixed substance from the outlet.

15. A dispense system according to claim 1, wherein the electronic control assembly is adapted to control the size of the portion of the substance dispensed.

16. A dispense system according to claim 1, wherein the electronic control assembly is adapted to control the movement of the operating member between the first and second locations.

17. A dispensing system for dispensing substance comprising a first pump assembly, an actuation valve, a dispense valve and an electronic control assembly, the actuation valve being in communication with the pump assembly and the dispense valve such that upon actuation of the actuation valve, the dispense valve is opened and the pump assembly is powered to dispense substance through the dispense valve, and such that when actuation of the actuation valve is ceased, pumping of substance through the pump assembly is ceased and the dispense valve is closed, the electronic control assembly being coupled to the actuation valve and being adapted to control the actuation of the actuation valve; and further comprising at least a second pump assembly mechanically linked to the first pump assembly for joint operation therewith, a mixer head for mixing substance dispensed from any two or more of the pump assemblies, wherein the mixer head comprises a hollow body having an outlet and at least two inlets, the inlets being connectable to respective pump assemblies, and a vaned rotor provided within the hollow body, the rotor rotating to mix substance dispensed from each of the pump assemblies and to dispense the mixed substance from the outlet.

18. The system of claim 17, wherein the electronic control assembly including a plurality of operating switches, a plurality of relays, a series of limit switches, a power supply, a solenoid, and circuitry arranged to provide a plurality of circuits, each circuit including a limit switch, a relay, an operating switch, the power supply, and the solenoid, wherein actuation of an operating switch closes its circuit to energize the solenoid and actuate the actuation valve.

19. The system of claim 18, wherein the pump assembly includes a rod displaceable within the assembly and adapted to dispense substance supplied to the assembly, the rod including a contact member, and wherein the limit switches are positioned so that when the rod is displaced the contact member of the rod contacts each limit switch and causes the limit switch associated with the closed circuit to open that circuit, thus de-energizing the solenoid and ceasing actuation of the actuation valve.

20. The system of claim 19, wherein the limit switches are aligned with respect to movement of the rod to enable dispensation of different quantities of substance relative to the linear position of each limit switch, and wherein the limit switches and circuitry are arranged so that actuation of more than one operating switch results in the dispensation of substance corresponding to the limit switch farthest along the displacement direction of the rod, thus ensuring the larger of the two substance portions corresponding to the operating switches is dispensed.

21. The system of claim 18, wherein the limit switches are selected from the group consisting of:
  microswitches;
  reed switches; and
  optical switches.

22. A dispensing system for dispensing substance comprising a first pump assembly, an actuation valve, a dispense valve and an electronic control assembly, the actuation valve being in communication with the pump assembly and the dispense valve such that upon actuation of the actuation valve, the dispense valve is opened and the pump assembly is powered to dispense substance through the dispense valve, and such that when actuation of the actuation valve is ceased, pumping of substance through the pump assembly is ceased and the dispense valve is closed, the electronic control assembly being coupled to the actuation valve and being adapted to control the actuation of the actuation valve; and further comprising at least one second pump assembly mechanically connected to the first pump assembly for joint operation therewith, wherein each of the pump assemblies is associated with a separate substance storage assembly, a separate actuation valve, and a common dispense valve.

23. The system of claim 22, wherein the electronic control assembly including a plurality of operating switches, a plurality of relays, a series of limit switches, a power supply, a solenoid, and circuitry arranged to provide a plurality of circuits, each circuit including a limit switch, a relay, an operating switch, the power supply, and the solenoid, wherein actuation of an operating switch closes its circuit to energize the solenoid and actuate the actuation valve.

24. The system of claim 23, wherein the first pump assembly includes a rod displaceable within the assembly and adapted to dispense substance supplied to the assembly, the rod including a contact member, and wherein the limit switches are positioned so that when the rod is displaced the contact member of the rod contacts each limit switch and causes the limit switch associated with the closed circuit to open that circuit, thus de-energizing the solenoid and ceasing actuation of the actuation valve.

25. The system of claim 24, wherein the limit switches are aligned with respect to movement of the rod to enable dispensation of different quantities of substance relative to the linear position of each limit switch, and wherein the limit switches and circuitry are arranged so that actuation of more than one operating switch results in the dispensation of substance corresponding to the limit switch farthest along the displacement direction of the rod, thus ensuring the larger of the two substance portions corresponding to the operating switches is dispensed.

26. The system of claim 23, wherein the limit switches are selected from the group consisting of:
   microswitches;
   reed switches; and
   optical switches.

27. A dispensing system for dispensing substance comprising a first pump assembly, an actuation valve, a dispense valve and an electronic control assembly, the actuation valve being in communication with the pump assembly and the dispense valve such that upon actuation of the actuation valve, the dispense valve is opened and the pump assembly is powered to dispense substance through the dispense valve, and such that when actuation of the actuation valve is ceased, pumping of substance through the pump assembly is ceased and the dispense valve is closed, the electronic control assembly being coupled to the actuation valve and being adapted to control the actuation of the actuation valve; and
   further comprising at least one second pump assembly being independently operable from the first pump assembly, wherein each of the pump assemblies is associated with a separate substance storage assembly, a separate actuation valve, and a common dispense valve.

28. The system of claim 27, wherein the electronic control assembly including a plurality of operating switches, a plurality of relays, a series of limit switches, a power supply, a solenoid, and circuitry arranged to provide a plurality of circuits, each circuit including a limit switch, a relay, an operating switch, the power supply, and the solenoid, wherein actuation of an operating switch closes its circuit to energize the solenoid and actuate the actuation valve.

29. The system of claim 28, wherein the first pump assembly includes a rod displaceable within the assembly and adapted to dispense substance supplied to the assembly, the rod including a contact member, and wherein the limit switches are positioned so that when the rod is displaced the contact member of the rod contacts each limit switch and causes the limit switch associated with the closed circuit to open that circuit, thus de-energizing the solenoid and ceasing actuation of the actuation valve.

30. The system of claim 29, wherein the limit switches are aligned with respect to movement of the rod to enable dispensation of different quantities of substance relative to the linear position of each limit switch, and wherein the limit switches and circuitry are arranged so that actuation of more than one operating switch results in the dispensation of substance corresponding to the limit switch farthest along the displacement direction of the rod, thus ensuring the larger of the two substance portions corresponding to the operating switches is dispensed.

31. The system of claim 28, wherein the limit switches are selected from the group consisting of:
   microswitches;
   reed switches; and
   optical switches.

32. A dispensing system for dispensing substance, comprising:
   a pump assembly including a rod displaceable within the assembly and adapted to dispense substance supplied to the assembly, the rod including a contact member;
   a nozzle for receiving the substance dispensed from the pump assembly and dispensing the substance to a target location;
   a dispense valve positioned between the pump assembly and the nozzle;
   an actuation valve that has a first mode of operation supplying power to the pump assembly for displacing the rod and at the same time supplying power to the dispense valve to permit substance to be dispensed from the pump assembly to the nozzle, the actuation valve having a second mode of operation supplying power to the dispense valve to prevent substance from being dispensed from the pump assembly to the nozzle;
   an electric device disposed to actuate the actuation valve between the first and second modes; and
   an electronic control assembly including a plurality of operating switches, a plurality of relays, a series of limit switches, a power supply, and circuitry arranged to provide a plurality of circuits, each circuit including a limit switch, a relay, an operating switch, the power supply, and the electric device, wherein actuation of an operating switch closes its circuit to energize the electric device and actuate the actuation valve to the first mode of operation, wherein the limit switches are positioned so that when the rod is displaced the contact member of the rod contacts each limit switch and causes the limit switch associated with the closed circuit to open that circuit, thus de-energizing the electric device and actuating the actuation valve to the second mode of operation.

33. The system of claim 32, wherein the limit switches are aligned with respect to movement of the rod to enable dispensation of different quantities of substance relative to the linear position of each limit switch, and wherein the limit switches and circuitry are arranged so that actuation of more than one operating switch results in the dispensation of substance corresponding to the limit switch farthest along the displacement direction of the rod, thus ensuring the larger of the two substance portions corresponding to the operating switches is dispensed.

34. The system of claim 32, wherein the limit switches are selected from the group consisting of:
   microswitches;
   reed switches; and
   optical switches.

35. A dispensing system for dispensing substance, comprising:
   a pump comprising a power cylinder and a dispense cylinder coaxial to the power cylinder, each of the cylinders having a respective piston therein, the pistons being coupled together so that fluid power applied to the power cylinder piston is effective to cause the dispense cylinder piston to draw substance to be dispensed into the dispense cylinder and to dispense substance from the dispense cylinder;
   an actuation valve for supplying fluid power to the power cylinder piston; and
   an electronic control assembly positioned so as to control the application of fluid power to the power cylinder piston, the control assembly including:
      a plurality of operating switches, a plurality of relays, a series of limit switches, a power supply, a solenoid positioned to actuate the actuating valve, and circuitry arranged to provide a plurality of circuits, each circuit including a limit switch, a relay, an operating switch, the power supply, and the solenoid, wherein actuation of an operating switch closes its associated circuit to energize the solenoid and actuate the actuation valve to supply fluid power to the piston in the power cylinder, wherein the limit switches are positioned so that when fluid power is applied, the power cylinder piston contacts each limit switch and causes the limit switch associated with the closed circuit to open that circuit, thus de-energizing the solenoid.

36. The system of claim 35, wherein the limit switches are aligned with respect to movement of the power cylinder piston to enable dispensation of different quantities of substance relative to the linear position of each limit switch, and wherein the limit switches and circuitry are arranged so that actuation of more than one operating switch results in the dispensation of substance corresponding to the limit switch farthest along the displacement direction of the power cylinder piston, thus ensuring the larger of the two substance portions corresponding to the operating switches is dispensed.

37. The system of claim 35, wherein the limit switches are selected from the group consisting of:

microswitches;

reed switches; and optical switches.

* * * * *